Oct. 9, 1962 V. PHILLIPS 3,057,096
DECORATIVE MEMBER FOR YARDS, GARDENS, AND THE LIKE
Filed May 23, 1960
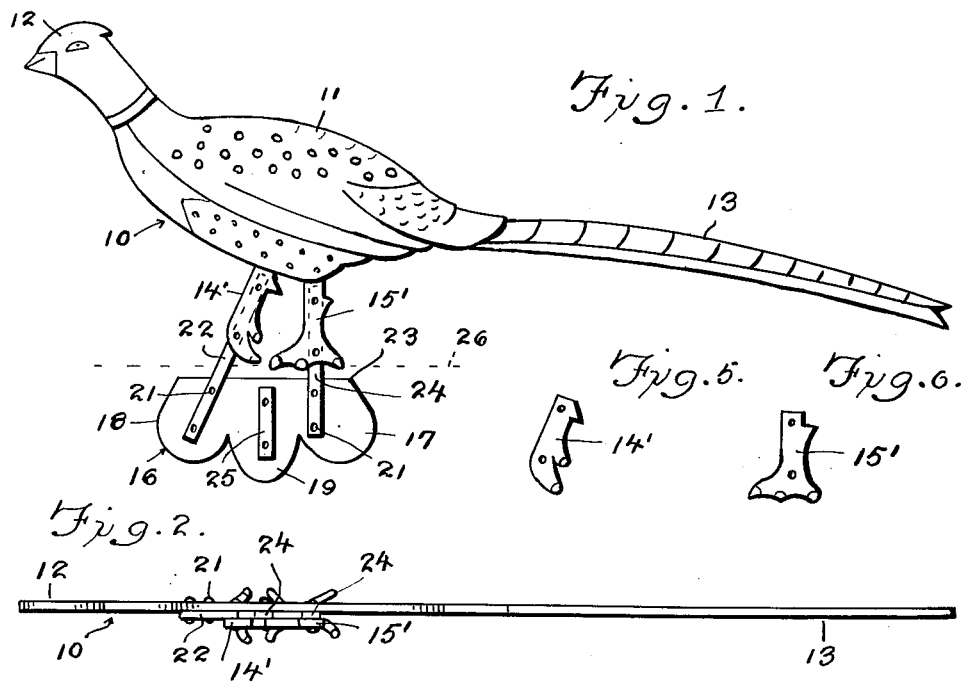
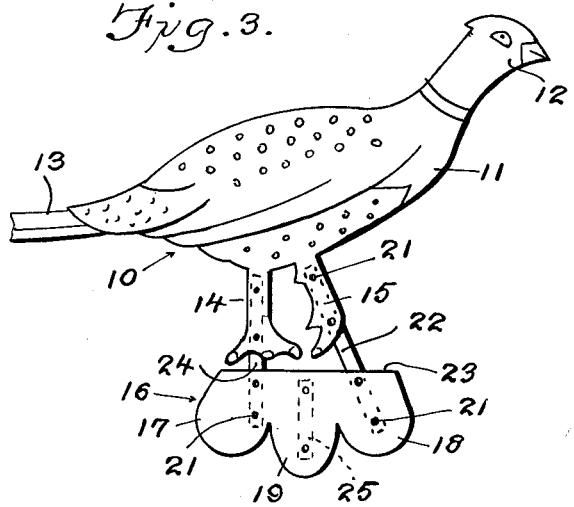
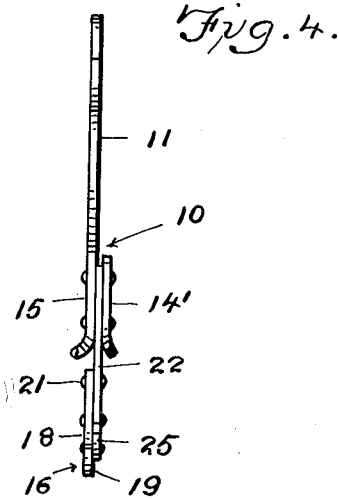
INVENTOR.
Velma Phillips
BY
Victor J. Evans & Co.
ATTORNEYS

United States Patent Office 3,057,096
Patented Oct. 9, 1962

3,057,096
DECORATIVE MEMBER FOR YARDS, GARDENS, AND THE LIKE
Velma Phillips, 24D Robles Del Rio,
Carmel Valley, Calif.
Filed May 23, 1960, Ser. No. 30,842
1 Claim. (Cl. 41—10)

This invention relates to a decorative member for yards, gardens or the like and more particularly to a decorative member which is shaped to resemble a live creature such as a pheasant, or similar specimen.

The object of the invention is to provide a decorative item which includes a unique and efficient means for permitting the member to be conveniently supported in a suitable or desired location such as a yard or garden of a home or other area.

Another object of the invention is to provide a decorative member which can be moved from place to place as desired, and wherein the decorative member is adapted to have a highly fanciful and esthetic appearance, the member including a supporting means which permits the device or member to be conveniently supported in a particular location and wherein there will be a tendency for the member to remain supported in the desired upright position without toppling over.

A further object of the invention is to provide a decorative member for yards, gardens or the like which is extremely simple and inexpensive to manufacture.

Other objects and advantages will be apparent during the course of the following description.

In the accompanying drawing, forming a part of this application, and in which like numerals are used to designate like parts throughout the same:

FIGURE 1 is a side elevational view of the decorative member of the present invention.

FIGURE 2 is a plan view of the present invention.

FIGURE 3 is a view looking at the opposite side from FIGURE 1.

FIGURE 4 is an end elevational view.

FIGURES 5 and 6 are views illustrating certain constructional details of the present invention.

Referring in detail to the drawings, the numeral 10 indicates a decorative member for yards, gardens and the like and according to the present invention the member 10 comprises a flat body member 11 which is shaped to resemble a fanciful creature such as a live bird which may be a pheasant and wherein the member 11 is adapted to be painted or otherwise colored in a highly attractive and esthetic manner, the numeral 12 indicating the head of the pheasant, while the numeral 13 indicating the tail. The body member 11 has secured thereto or formed integral therewith first and second spaced apart depending upright leg portions or legs 14 and 15.

The numeral 16 indicates a vertically disposed base, and the base 16 is shaped to comprise curved end portions 17 and 18 as well as an intermediate portion 19 which is also curved or rounded on the lower edge portion thereof. The end portions 17 and 18 are of the same size, while the intermediate portion 19 is of greater size than the end portions 17 and 18 and this construction serves to insure that the member 10 will be supported in its desired upright position since the base 16 is constructed so as to help stabilize the decorative member when the same is being used in a yard, garden or the like. The upper edge portion 23 of the base 16 is straight, as shown in the drawing.

There is further provided a first upright support member which is indicated generally by the numeral 24, and the support member 24 is adapted to be secured in face to face abutting relation with respect to the leg 14 and to the base 16 in any suitable manner, as for example by means of securing elements or screws 21. A second upright support member 22 is arranged angularly with respect to the first support member 24, and the second support member 22 is secured in face to face abutting relation with respect to the leg 15 and base 16 by securing elements 21, other upright leg sections 14' and 15' are disposed in face to face relation with respect to the support members 22 and 24, respectively, and the side thereof opposite to the leg portions or legs 14 and 15 and are secured in place by means of the securing elements 21 and this construction serves to insure that the entire unit will have a highly attractive and esthetic appearance and wherein the legs 14 and 14' and 15 and 15' are arranged on opposite sides of the members 22 and 24 so as to cover up these bars or members 22 and 24 in order to provide a completely attractive and structurally rigid device.

There is further provided a brace or bar 25 which is interposed between the lower portions of the members 22 and 24, and the bar 25 is adapted to be secured to the intermediate portion of the base 16, as for example by means of securing elements 21. As shown in the drawings, the members 22, 25, and 24 are coplanar and are arranged in a vertical plane. This construction serves to insure that the entire unit is rigid and wherein the parts will not readily become out of shape even after long periods of useage in inclement or adverse weather conditions or the like.

From the foregoing, it is apparent that there has been provided a decorative item or member for use in yards, gardens or other locations, and the present invention will enhance or increase the attractiveness of the surrounding area in which it is used. The member 10 includes the body portion or member 11 which is made or formed to resemble a highly attractive or fanciful creature such as a pheasant and suitable coloring is adapted to be used in order to increase the attractiveness thereof. The legs 14 and 15 may be made integral with the body 11 and according to the present invention there is provided a highly effective means of supporting the member and this supporting means comprises members 24 and 25 which are fastened to the legs 14 and 15 as well as to the legs 14' and 15' as well as being fastened to the base 16. The base 16 includes the end portions as well as the intermediate rounded enlarged portion and this arrangement provides a highly stable base which is not likely to tip over. With the parts arranged as shown in the drawings, the center of gravity will be such that the tendency will be for the member 11 to remain in a vertical position or plane which is the proper or desired location or position thereof. The parts thus lend support to the decorative item of the present invention.

The parts can be made of any suitable material and in different shapes or sizes.

While the present invention has been illustrated as representing a pheasant, it is to be understood that the principles of the present invention are applicable to other types of fanciful creatures such as peacocks, peafowl or the like. The parts may be made of a material which is not affected by adverse weather conditions and machine screws can be used for fastening the parts together. The openings for receiving the machine screws may be countersunk so as to provide smooth surfaces contiguous thereto. The body member 11 may be decorated or painted the same on both sides so that regardless of the position of the viewer or onlooker a highly decorative and attractive object will appear or be observed. Various types of specimens may be simulated such as a golden pheasant, Silver pheasant, Japanese pheasant, Chinese Ringneck pheasant or the like.

In FIGURE 1 the numeral 26 indicates the ground line, and the numeral 23 indicates the upper straight edge portion of the base 16. The member 24 is vertically disposed, and the member 23 is arranged at an angle with respect to the member 24. The brace 25 helps strengthen the parts such as the base 16. The feet such as the feet 14' and 15' may be made of sheet metal and these feet or legs 14' and 15' are adapted to be placed back of the other feet 14 and 15 and the strap iron members 24 and 22 have their upper ends interposed between the steps or pairs of legs 14 and 14' and 15 and 15'. Thus, the securing elements or bolts 21 serve to connect the members 24 and 22 to both pairs of legs as shown in the drawings. As shown in FIGURE 1, the base or support 16 is adapted to have its upper edge 23 arranged just below the ground level 26 so that the lower ends of the feet 14 and 14' and 15 and 15' will touch ground level.

Minor changes in shape, size and rearrangement of details coming within the field of invention claimed may be resorted to in actual practice, if desired.

What is claimed is:

In an ornament for a lawn including an upright flat body member shaped to fit the outline of a living creature and decorated so as to resemble said creature, said member including at least one depending portion simulating a leg of the creature, a base disposed vertically below said leg portion, an upright support member having the part adjacent the upper end disposed in face to face abutting relation with respect to one face of said leg portion and having the portion adjacent the lower end disposed in face to face abutting relation with respect to said base and secured thereto, and means securing said support member to said leg portion, an upright flat auxiliary leg section simulating said creature's leg disposed in face to face abutting relation with respect to said support member on the side of the latter remote from said leg portion, said section being secured to said support member by said means securing said support member to said leg portion.

References Cited in the file of this patent

UNITED STATES PATENTS

| 1,986,562 | Davis | Jan. 1, 1935 |
| 2,294,241 | Rober | Aug. 25, 1942 |
| 2,398,471 | Short et al. | Apr. 16, 1946 |
| 2,478,480 | Greer | Aug. 9, 1949 |
| 2,855,712 | Diletto | Oct. 14, 1958 |
| 2,896,372 | Austin | July 28, 1959 |

FOREIGN PATENTS

| 14,785 | Great Britain | 1909 |
| 656,767 | France | Jan. 5, 1929 |
| 797,633 | France | Feb. 17, 1936 |
| 899,170 | France | July 31, 1944 |